(12) United States Patent
Zhong et al.

(10) Patent No.: US 12,564,287 B2
(45) Date of Patent: Mar. 3, 2026

(54) SMOKELESS FRYING AND BAKING MACHINE AND CONTROL METHOD THEREOF

(71) Applicant: Guangdong Link Plus Technology Group Co., Ltd, Foshan (CN)

(72) Inventors: Jingming Zhong, Foshan (CN); Huasheng Lai, Foshan (CN)

(73) Assignee: Guangdong Link Plus Technology Group Co., Ltd., Foshan (CN)

( * ) Notice: Subject to any disclaimer, the term of this patent is extended or adjusted under 35 U.S.C. 154(b) by 692 days.

(21) Appl. No.: 17/987,069

(22) Filed: Nov. 15, 2022

(65) Prior Publication Data

US 2023/0329480 A1     Oct. 19, 2023

Related U.S. Application Data

(63) Continuation of application No. PCT/CN2022/087714, filed on Apr. 19, 2022.

(30) Foreign Application Priority Data

Apr. 15, 2022     (CN) .......................... 202210394005.1

(51) Int. Cl.
*A47J 36/32*          (2006.01)
*A47J 37/06*          (2006.01)

(52) U.S. Cl.
CPC ........... *A47J 36/32* (2013.01); *A47J 37/0611* (2013.01); *A47J 37/0641* (2013.01); *A47J 37/0664* (2013.01)

(58) Field of Classification Search
CPC .... A47J 36/32; A47J 37/0611; A47J 37/0641; A47J 37/0664; A47J 37/103; A47J 37/108
See application file for complete search history.

(56) References Cited

U.S. PATENT DOCUMENTS

| | | | |
|---|---|---|---|
| 6,369,366 B1* | 4/2002 | Mullen | A47J 37/0611 |
| | | | 219/525 |
| 6,608,292 B1* | 8/2003 | Barnes | A47J 37/0611 |
| | | | 99/425 |

(Continued)

*Primary Examiner* — Elizabeth M Kerr
*Assistant Examiner* — Keith Brian Assante
(74) *Attorney, Agent, or Firm* — Wang Law Firm, Inc.

(57) ABSTRACT

The present disclosure discloses a smokeless frying, baking machine, control method thereof. The machine comprises lower shell, handle, upper shell, fan component, angle detection component, rotating speed detection component and controller, handle is rotatably mounted on lower shell, upper shell is rotatably mounted on handle through floating component, upper shell is rotatable back and forth to enclose baking trays to form cooking cavity, upper shell is located in unfolding tray; fan component for sucking oil smoke, angle detection component is to detect angle change between handle and upper shell; rotating speed detection component is to detect actual rotating speed of fan component, controller is electrically connected with angle detection, rotating speed detection and fan component. The fan component is regulated according to the size of flying and baking cavity, cooking duration of current cooking stage is compensated according to speed of fan component to ensure kitchen ventilator and cooking effect.

7 Claims, 5 Drawing Sheets

(56) References Cited

U.S. PATENT DOCUMENTS

| | | | | | |
|---|---|---|---|---|---|
| 11,051,651 | B1 * | 7/2021 | Mitrik | ................. | A47J 37/0611 |
| 2010/0319550 | A1 * | 12/2010 | Wu | ...................... | A47J 37/0611 |
| | | | | | 99/380 |
| 2015/0004289 | A1 * | 1/2015 | Volatier | .................... | A23L 5/15 |
| | | | | | 99/344 |
| 2015/0033952 | A1 * | 2/2015 | Fung | .................. | F24C 15/2035 |
| | | | | | 55/467 |
| 2015/0033954 | A1 * | 2/2015 | Fung | .................. | A47J 37/0694 |
| | | | | | 99/446 |
| 2015/0033956 | A1 * | 2/2015 | Fung | ....................... | A47J 36/36 |
| | | | | | 99/645 |
| 2015/0033957 | A1 * | 2/2015 | Fung | ....................... | A47J 36/38 |
| | | | | | 55/357 |
| 2015/0037471 | A1 * | 2/2015 | Fung | ....................... | A23L 5/10 |
| | | | | | 99/344 |
| 2015/0037472 | A1 * | 2/2015 | Fung | ................... | A47J 37/0611 |
| | | | | | 99/342 |
| 2015/0064316 | A1 * | 3/2015 | Volatier | ................. | A47J 36/32 |
| | | | | | 426/233 |
| 2015/0312964 | A1 * | 10/2015 | Sorenson | ............ | H05B 1/0266 |
| | | | | | 219/443.1 |
| 2015/0366402 | A1 * | 12/2015 | Wu | ...................... | A47J 37/0629 |
| | | | | | 99/376 |
| 2016/0113438 | A1 * | 4/2016 | Hanson | ................... | A47J 31/00 |
| | | | | | 700/275 |
| 2016/0360926 | A1 * | 12/2016 | Chang | ..................... | A47J 43/18 |
| 2017/0367529 | A1 * | 12/2017 | Metz | .................. | A47J 37/0676 |
| 2019/0200803 | A1 * | 7/2019 | Chuang | .............. | A47J 37/0676 |
| 2021/0378445 | A1 * | 12/2021 | Nandoliya | .......... | F24C 15/2042 |

* cited by examiner

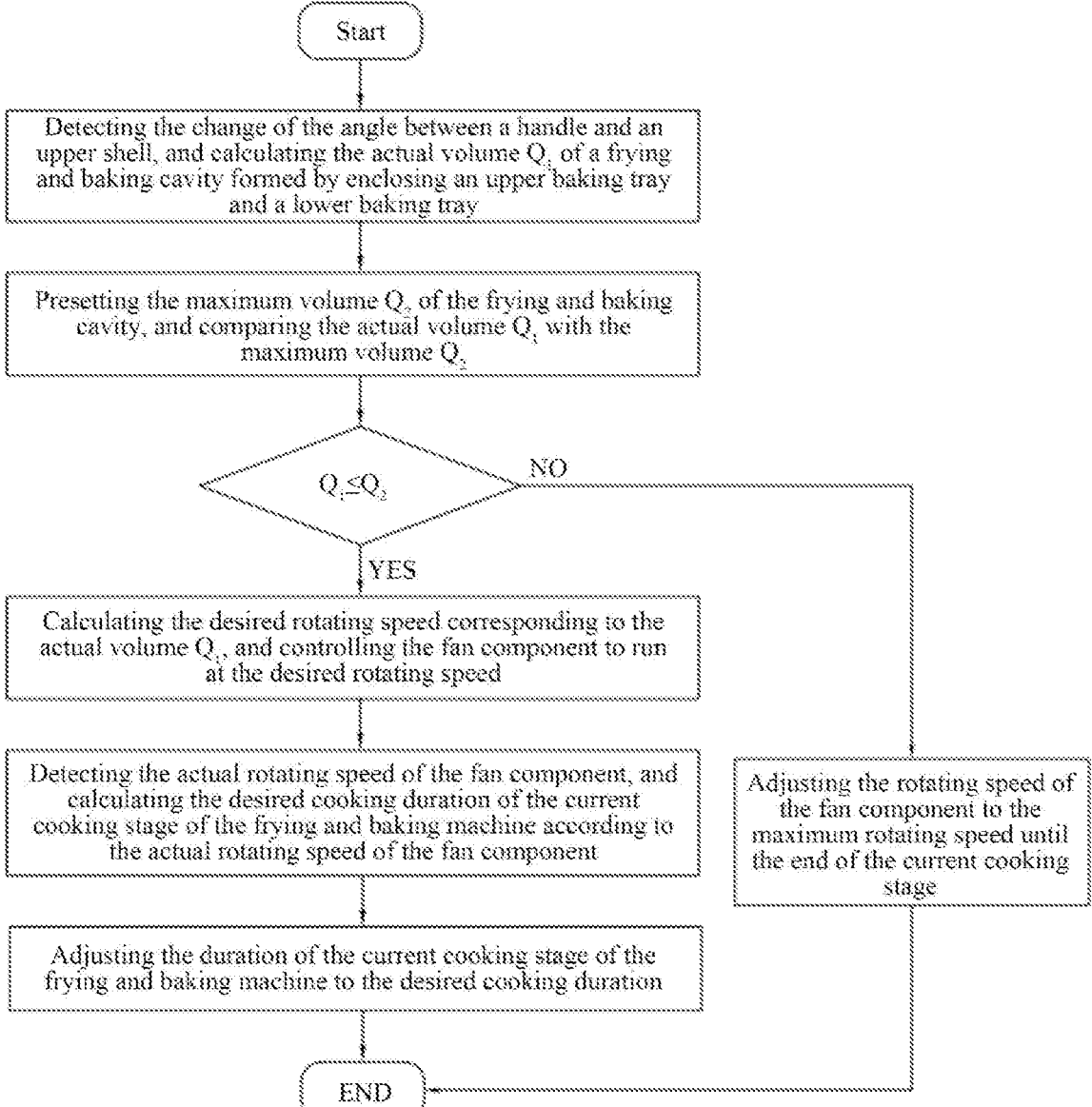

Start

Detecting the change of the angle between a handle and an upper shell, and calculating the actual volume $Q_1$ of a frying and baking cavity formed by enclosing an upper baking tray and a lower baking tray Presetting the maximum volume $Q_2$ of the frying and baking cavity, and comparing the actual volume $Q_1$ with the maximum volume $Q_2$ $Q_1 \leq Q_2$          NO

YES

Calculating the desired rotating speed corresponding to the actual volume $Q_1$, and controlling the fan component to run at the desired rotating speed Detecting the actual rotating speed of the fan component, and calculating the desired cooking duration of the current cooking stage of the frying and baking machine according to the actual rotating speed of the fan component Adjusting the rotating speed of the fan component to the maximum rotating speed until the end of the current cooking stage Adjusting the duration of the current cooking stage of the frying and baking machine to the desired cooking duration

END

FIG. 9

SMOKELESS FRYING AND BAKING MACHINE AND CONTROL METHOD THEREOF

CROSS-REFERENCE TO RELATED APPLICATIONS

This application is a continuation of co-pending International Patent Application No. PCT/CN2022/087714, filed on Apr. 19, 2022, which claims the priority and benefit of Chinese patent application number 20221039005.1 filed on Apr. 15, 2022 with China National Intellectual Property Administration, the entire contents of which are incorporated herein by reference.

TECHNICAL FIELD

The present disclosure relates to the technical field of cooking equipment, particular to a smokeless frying and baking machine and a control method thereof.

BACKGROUND

There are smokeless open baking trays in the market, and the smokeless open baking trays use an exhaust system so that the frying and baking machine fries and bakes food in an open and smokeless manner. However, at present, the twin-tray in the market cannot realize smoke extraction of combining the trays or unfolding for frying and baking in the process of frying and baking, so that users cannot enjoy smokeless cooking when combining the trays or unfolding for frying and baking.

Moreover, the smokeless baking tray in the market generally uses the design, of a circulating air channel. It is troublesome to remove a fan and an air channel. It is easy for dirt and filth in the circulating air channel to breed bacteria and produce peculiar smell. The flowing air will circulate through the food after circulating through the air channel, so that it is easy for food to be contaminated with bacteria and peculiar smell, thus affecting food sanitation.

SUMMARY

The present disclosure aims at solving at least one of the technical problems existing in the prior art. To this end, the present disclosure provides a smokeless frying and baking machine and a control method thereof, and uses the following technical scheme.

A smokeless frying and baking machine comprises:

a lower shell, which is provided with a lower baking tray;

a handle, which is rotatably mounted on the lower shell;

an upper shell, which is provided, with an upper baking tray, wherein the upper shell is rotatably mounted on the handle through a floating component, and the handle is configured to drive the upper shell to rotate back and forth to be close to the lower shell so that the upper baking tray and the lower baking tray are enclosed to form a frying and baking cavity or rotate away from the lower shell to the position of unfolding the tray;

a fan component, wherein the lower shell is provided with an air channel, the fan component is mounted on the lower shell and is configured to generate negative pressure in the air channel to suck oil smoke generated by the lower baking tray and the upper baking tray, an angle detection component, wherein the angle detection component is mounted between the handle and the upper shell and is configured to detect the change of the angle between the handle and the upper shell;

a rotating speed detection component, wherein the rotating speed detection component is mounted on the fan component and is configured to detect the actual rotating speed of the fan component;

a controller, which is mounted on the lower shell and is electrically connected with the fan component, the angle detection component and the rotating speed detection component, respectively, wherein the controller is configured to calculate the actual volume of the frying and baking cavity according to the angle change, when the actual volume is less than the maximum volume, control the rotating speed of the fan component according to the desired rotating speed calculated by the actual volume, and then calculate the desired cooking duration of the current cooking stage of the frying and baking machine according to the actual rotating speed.

Preferably, the air channel is provided with two air inlets, and the two air inlets are both provided at the rear side of the lower shell and are distributed at intervals from front to back.

Preferably, the two air inlets comprise a first air inlet and a second air inlet, respectively, and when the first air inlet is located above the lower baking tray and the upper baking tray is distributed in the position of unfolding the tray, the second air inlet is located above the upper baking tray.

Preferably, the smokeless frying and baking machine further comprises a filtered water box, wherein the filtered water box is provided with an air intake and an air vent communicated with the inside thereof, the filtered water box is provided at the outlet of the air channel and is communicated with the air channel through the air intake, and the air vent is communicated with the outside.

Preferably, the rotating speed detection component comprises a speed measuring sensor, the speed measuring sensor is a Hall sensor or a photoelectric sensor, the fan component comprises a motor and a wind wheel mounted at the output end of the motor, the rotating speed detection component is mounted on the wind wheel and is configured to detect the rotating speed of the wind wheel, and the motor and the rotating speed detection component are electrically connected with the controller, respectively.

Preferably, the smokeless frying and baking machine further comprises an oil receiving tray, wherein the air channel is provided with an oil leakage hole on a side wall below the fan component, and the oil receiving tray is mounted on the lower shell and is located below the oil leakage hole.

Preferably, the smokeless frying and baking machine further comprises two oil baffle plates, and the two oil baffle plates are detachably provided on both sides of the lower shell.

Preferably, the oil baffle plates are in magnetic adsorption connection with the lower shell.

The present disclosure further provides a control method based on the smokeless frying and baking machine, comprising the following steps:

Step 1, detecting the change of the angle between a handle and an upper shell, and calculating the actual volume Q1 of a frying and baking cavity formed by enclosing an upper baking tray and a lower baking tray;

Step 2, presetting the maximum volume Q2 of the frying and baking cavity, and comparing the actual volume Q1 with the maximum volume Q2;

if the actual volume Q1 is less than or equal to the maximum volume Q2, calculating the desired rotating speed corresponding to the actual volume, and controlling the fan component to run at the desired rotating speed;

calculating the desired rotating speed V with the formula: V=V0+Q1*ΔV, where V0 is the preset rotating speed in the current cooking stage, and ΔV is the preset speed variable that varies with the volume of the frying and baking cavity;

detecting the actual rotating speed. V' of the fan component, and calculating the desired cooking duration of the current cooking stage of the frying and baking machine according to the actual rotating speed. V' of the fan component;

calculating the desired cooking duration T with the formula: T=T0+V' ΔT, where TO is the preset cooking duration of the current cooking stage, and ΔT is the preset time variable that varies with the volume of the frying and baking cavity;

adjusting the duration of the current cooking stage of the frying and baking machine to the desired cooking duration;

if the actual volume Q1 is greater than the maximum volume Q2, adjusting the rotating speed of the fan component to the maximum rotating speed until the end of the current cooking stage.

Preferably, calculating the actual volume Q1 of the frying and baking cavity enclosed by the upper baking tray and the lower baking tray with the formula:

$$Q1=a*b*(\Delta R*m)$$

where a is the length of a baking tray, b is the width of a baking tray, ΔR is the resistance change value detected by an angle sensor, and m is a quantitative coefficient.

According to the frying and baking machine of the present disclosure, the rotating speed of the fan component is regulated according to the size of the frying and baking cavity, and the cooking duration of the current cooking stage is compensated according to the actual rotating speed of the fan component, so as to ensure the kitchen ventilator effect and the cooking effect of the flying and baking machine.

BRIEF DESCRIPTION OF DRAWINGS

The above and/or additional aspects and advantages of the present disclosure will become apparent and understandable from the description of embodiments taken in conjunction with the following drawings, in which:

FIG. 9 is a flow chart of a control method of a smokeless frying and baking machine according to Embodiment 2 of the present disclosure.

Figure 1:
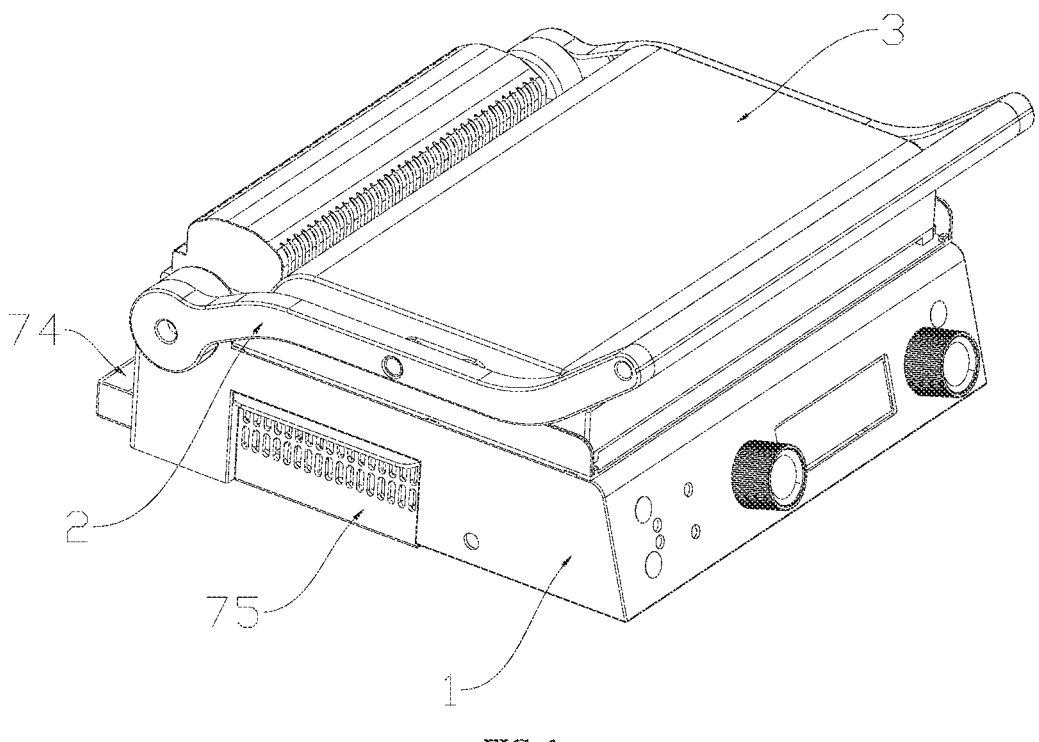
FIG. 1 is a schematic structural diagram of a smokeless frying and baking machine according to Embodiment 1 of the present disclosure when combining trays.
Figure 2:
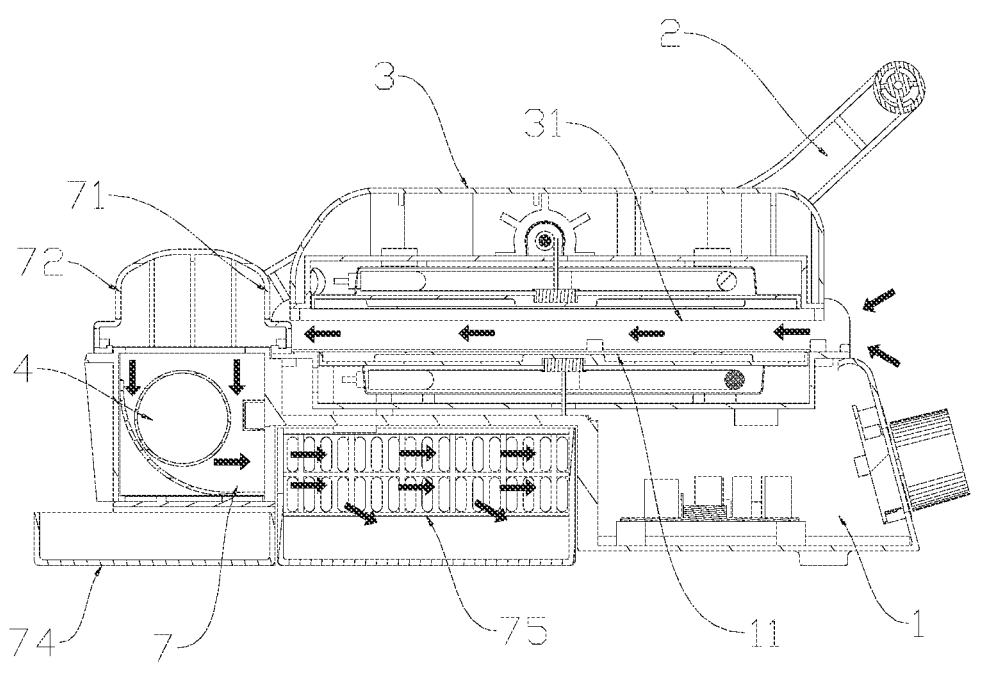
FIG. 2 is a first cross-sectional view of a smokeless flying and baking machine according to Embodiment 1 of the present disclosure when combining trays.
Figure 3:
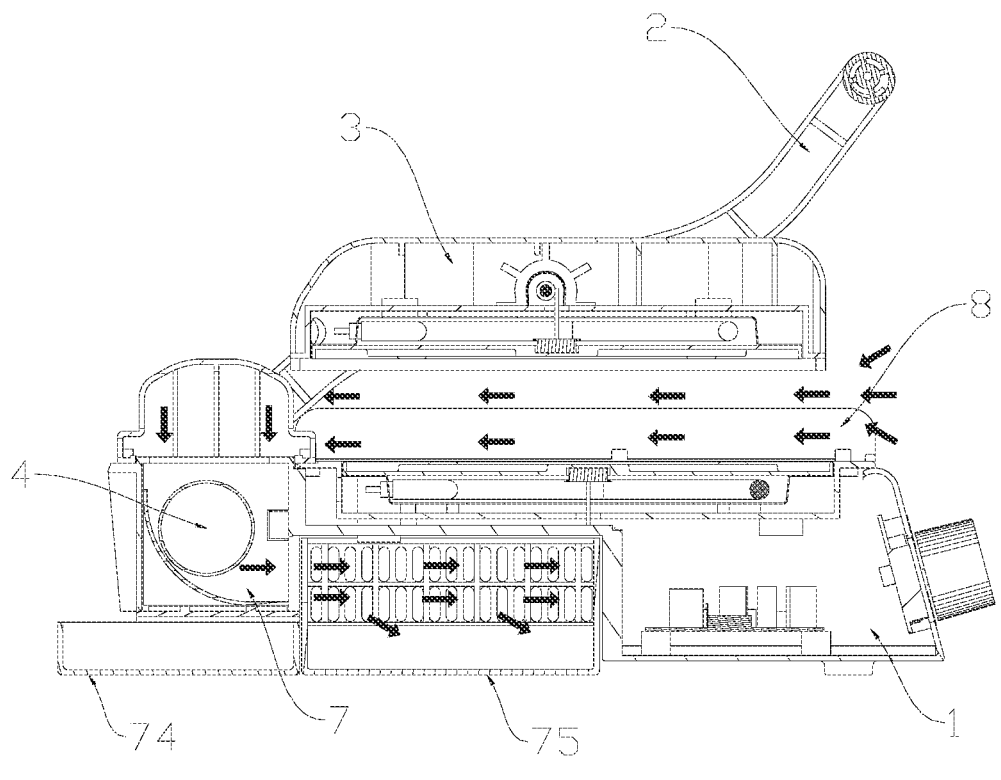
FIG. 3 is a second cross-sectional view of a smokeless frying and baking machine according to Embodiment 1 of the present disclosure when combining trays.
Figure 4:
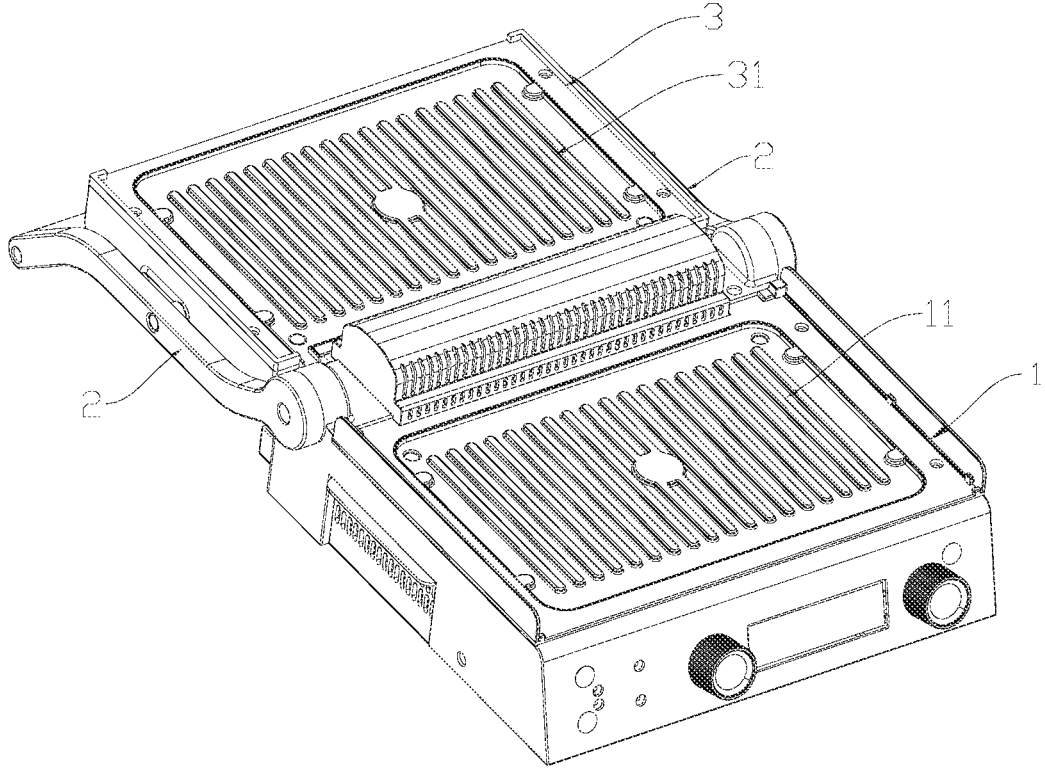
FIG. 4 is a schematic structural diagram of a smokeless frying and baking machine according to Embodiment 1 of the present disclosure when unfolding the tray.
Figure 5:
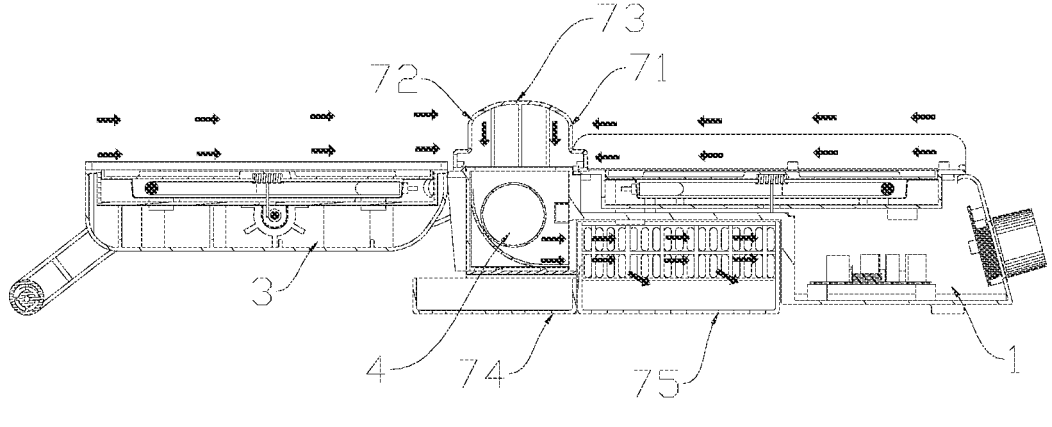
FIG. 5 is a schematic structural diagram of a smokeless frying and baking machine according to Embodiment 1 of the present disclosure when unfolding the tray.
Figure 6:
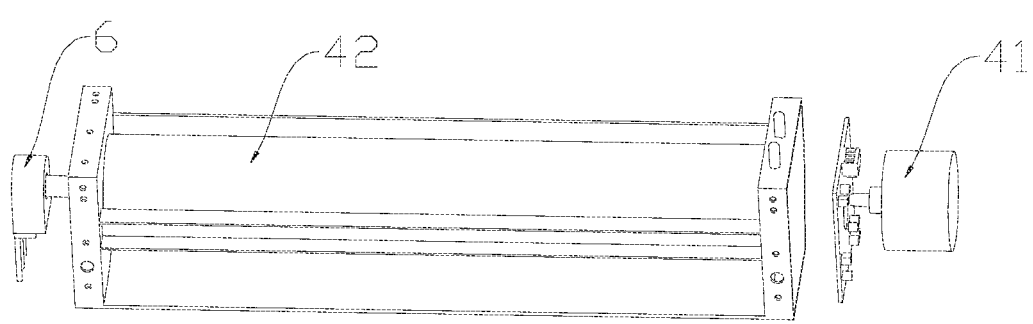
FIG. 6 is a schematic structural diagram of an exhaust component according to Embodiment 1 of the present disclosure.

The specific meanings of the reference numbers are as follows:

1. Lower shell; 11. Lower baking tray; 2. Handle; 3. Upper shell; 31. Upper baking tray; 4. Fan component; 41. Variable-frequency motor; 42. Wind wheel; 5. Angle detection component; 6. Rotating speed detection component; 7. Air channel; 71. First air inlet; 72. Second air inlet; 73, Filter grille; 74. Oil receiving tray; 75. Filtered water box; 8. Oil baffle plate.

DETAILED DESCRIPTION

The specific embodiments of the present disclosure will be described in detail in this section. The preferred embodiments of the present disclosure are shown in the attached drawings, which serves to supplement the description in the written part of the specification with figures, so that people can intuitively and vividly understand each technical feature and the overall technical scheme of the present disclosure, but it should not be understood as limiting the scope of protection of the present disclosure.

In the description of the present disclosure, "a plurality of" means more than two, and "greater than, less than, more than, etc." are understood as excluding this number, and above, below, within, etc. are understood as including this number. If the first and second descriptions are only used for the purpose of distinguishing technical features, the descriptions cannot be understood as indicating or implying relative importance, implicitly indicating the number of indicated technical features, or implicitly indicating the sequence of indicated technical features.

In the description of the present disclosure, it should be understood that for the orientational description, the orientational or positional relationships indicated by the terms such as "up", "down", "front", "back", "left" and "right" are based on the orientational or positional relationships shown in the drawings only for the convenience of describing the present disclosure and simplifying the description, rather than indicate or imply that the referred devices or elements must have a specific orientation, be constructed and operated in a specific orientation, and therefore should not be construed as limiting the present disclosure.

In the present disclosure, unless otherwise defined expressly, the terms such as "provide", "mount" and "connect" should be understood broadly, for example, it can be direct connection or indirect connection through an intermediate medium; fixed connection, detachable connection or integral connection; mechanical connection; or the internal communication of two elements or the interaction between two elements. Those skilled in the art can reasonably determine the specific meaning of the above terms in the present disclosure in combination with the specific content of the technical scheme.

Embodiment 1

Referring to FIGS. 1-8, Embodiment 1 of the present disclosure is provided, which discloses a smokeless frying and baking machine, comprising:

a lower shell 1, which is provided with a lower baking tray 11;

a handle 2, which is rotatably mounted on the lower shell 1;

an upper shell 3, which is provided with an upper baking tray 31, wherein the upper shell 3 is rotatably mounted on the handle 2 through a floating component, and the handle 2 is configured to drive the upper shell 3 to rotate back and forth to be close to the lower shell 1 so that the upper baking tray 31 and the lower baking tray 11 are enclosed to form a frying and baking cavity or rotate away from the lower shell 1 to the position of unfolding the tray;

a fan component 4, wherein the lower shell 1 is provided with an air channel 7, the fan component 4 is mounted on the lower shell 1 and is configured to generate negative pressure in the air channel 7 to suck oil smoke generated by the lower baking tray 11 and the upper baking tray 31, an angle detection component 5, wherein the angle detection component 5 is mounted between the handle 2 and the upper shell 3 and is configured to detect the change of the angle between the handle 2 and the upper shell 3;

a rotating speed detection component 6, wherein the rotating speed detection component 6 is mounted on the fan component 4 and is configured to detect the actual rotating speed of the fan component 4;

a controller, which is mounted on the lower shell 1 and is electrically connected with the fan component 4, the angle detection component 5 and the rotating speed detection component 6, respectively, wherein the controller is configured to calculate the actual volume of the frying and baking cavity according to the angle change, when the actual volume is less than the maximum volume, control the rotating speed of the fan component 4 according to the desired rotating speed calculated by the actual volume, and then calculate the desired cooking duration of the current cooking stage of the frying and baking machine according to the actual rotating speed.

The controller is configured to receive the change of the angle between the handle 2 and the upper shell 3, calculate the actual volume of the frying and baking cavity according to the angle change, compare the actual volume with the maximum volume, if the actual volume is less than or equal to the maximum volume, calculate the desired rotating speed corresponding to the actual volume, and control the fan component 4 to run at the desired rotating speed. The controller receives the actual rotating speed detected by the rotating speed detection component 6, calculates the desired cooking duration of the current cooking stage of the frying and baking machine according to the actual rotating speed of the fan component, and adjusts the duration of the current cooking stage of the frying and baking machine as the desired cooking duration; and if the actual volume is greater than the maximum volume, adjusts the rotating speed of the fan component to the maximum rotating speed until the end of the current cooking stage.

The working principle of the smokeless frying and baking machine in this embodiment is as follows.

When the upper shell 3 rotates to the position of combining the tray or unfolding the tray close to the lower shell 1, the fan component 4 generates negative pressure in the air channel 7, so that the oil smoke generated on the upper baking tray 31 and the lower baking tray 11 is sucked and discharged from the air channel 7.

After the food is placed on the lower baking tray 11, after the upper shell 3 is rotated to combine the tray with the lower shell 1, the angle detection component 5 detects the change of the angle between the handle 2 and the upper shell 3 and sends the change to the controller. According to the change of the angle between the handle 2 and the upper shell 3, the actual volume of the frying and baking cavity is calculated, and the desired rotating speed of the fan component 4 is calculated. The controller then sends a signal to the fan component 4 to adjust the rotating speed of the fan component 4. Therefore, the rotating speed of the fan component 4 is regulated according to the size of the frying and baking cavity; so as to ensure the kitchen ventilator effect of the frying and baking machine. Meanwhile, the rotating speed detection component 6 detects the actual rotating speed of the fan component 4. The controller compensates for the cooking duration of the current cooking stage according to the desired actual rotating speed of the fan component 4, so as to prevent the fast air flow speed from affecting cooking and ensure the cooking effect of the frying and baking machine. The rotating speed detection component 6 can detect the actual rotating speed of the fan component 4, so as to prevent the calculation error of the desired cooking duration caused by the difference between the actual rotating speed of the fan component 4 and the desired rotating speed, and ensure the cooking effect of the frying and baking machine.

For example, the desired rotating speed of the fan component 4 is 2000 r/min, and the actual rotating speed of the fan component 4 detected by the rotating speed detection component 6 is 1900 r/min, so that the calculation of the desired cooking duration can be more accurate by compensating for the cooking duration with the actual rotating speed.

The floating component is used to keep the upper baking tray 31 horizontal. The handle 2 is mounted on the upper shell 3 by a floating component to keep horizontal, which belongs to the conventional technology in the field. The structure of the floating component is not specifically defined in the present disclosure.

Specifically, the angle detection component 5 is an angle sensor. One end of the rotating shaft is connected with the floating component. The angle sensor is mounted at the other end of the rotating shaft. Moreover, the angle sensor is provided with an inner ring and an outer ring Which can rotate relatively. The inner ring is coaxially and fixedly connected with the rotating shaft, and the outer ring is fixedly connected with the handle. The angle sensor is configured to detect the change of the angle between the inner ring and the outer ring and send the corresponding resistance change value $\Delta R$ to the controller, so that the controller calculates the volume of the frying and baking cavity according to the resistance change value $\Delta R$.

Preferably, the air channel 7 is provided with two air inlets, and the two air inlets are distributed on one side of the lower shell 1 close to and far away from the frying and baking cavity.

When the upper shell 3 is in the position of unfolding the tray, the two air inlets are distributed between the upper tray 31 and the lower tray 11, which is suitable for the kitchen ventilator when the frying and baking machine is in the position of combining the tray and unfolding the tray.

More specifically, the two air inlets comprise a first air inlet 71 and a second air inlet 72, respectively, and when the first air inlet 71 is located above the lower baking tray 11 and the upper baking tray 31 is distributed in the position of unfolding the tray, the second air inlet 72 is located above the upper baking tray 31.

When the first air inlet 71 is located above the lower baking tray 11, or the second air inlet 72 is distributed above the upper baking tray 31 in the position of unfolding the tray, the first air inlet 71 or the second air inlet 72 has a better suction effect on the oil smoke generated on the upper baking tray 31 and the lower baking tray 11.

On the basis of the above, the frying and baking machine further comprises a filter grille 73. The filter grille 73 is mounted on the lower shell 1 and is located at the entrance of the air channel 7. The filter grille 73 is provided with ventilation holes penetrating therethrough, and the ventilation holes form the air inlet.

As shown in the figures, the front side and the rear side of the filter grille 73 are provided with ventilation holes, respectively, and the ventilation holes on the front side and the rear side form the first air inlet 71 and the second air inlet 72, respectively.

The filter grille 73 can preliminarily filter the steam and oil mist in the oil smoke.

Figure 7:
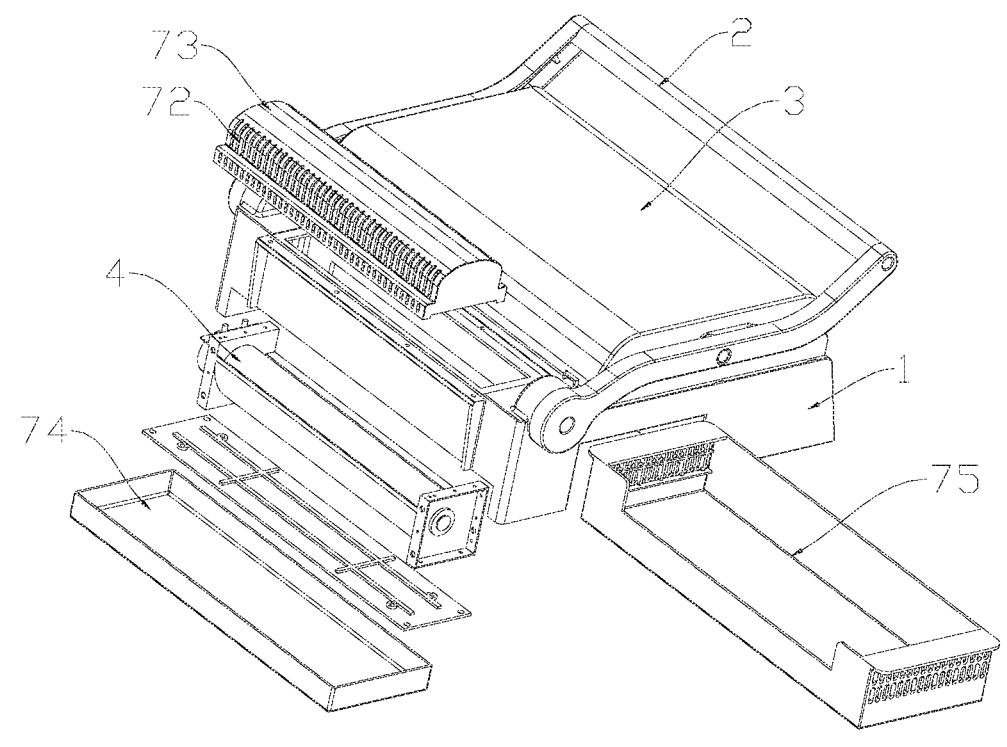
FIG. 7 is a schematic diagram of mounting an exhaust component according to Embodiment 1 of the present disclosure.
Figure 8:
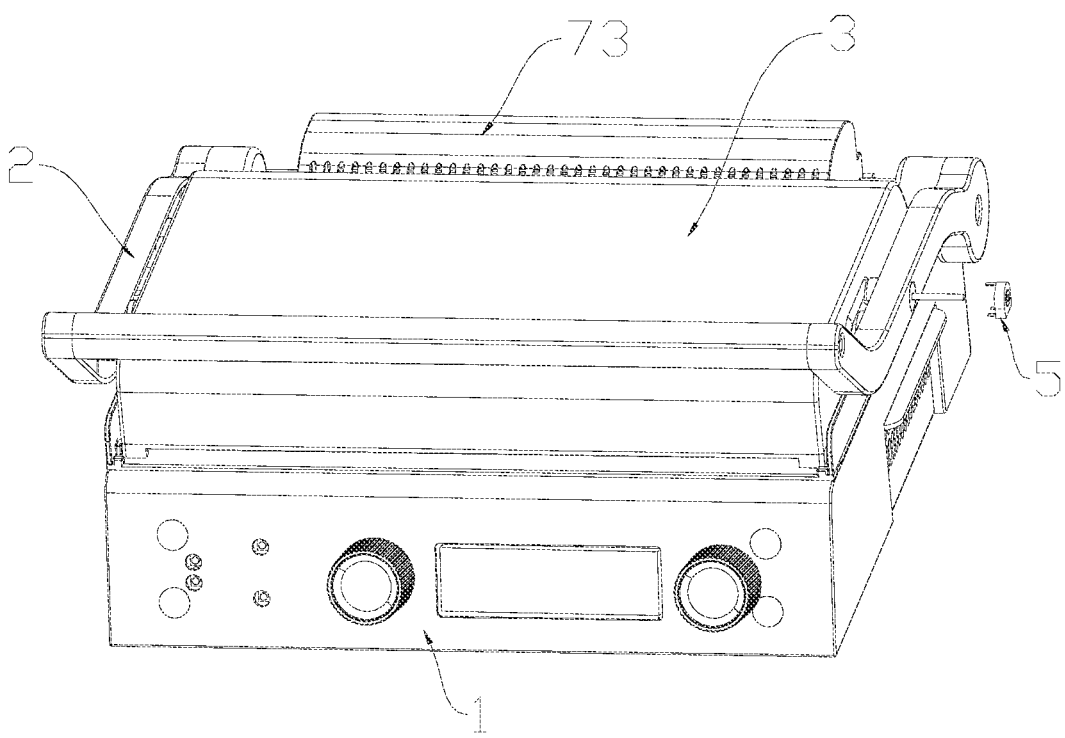
FIG. 8 is a schematic diagram of mounting an angle detection component according to Embodiment 1 of the present disclosure.

Preferably, the smokeless frying and baking machine further comprises a filtered water box 75, the filtered water box 75 is provided with an air intake and an air vent communicated with the inside thereof, the filtered water box 75 is provided at the outlet of the air channel 7 and is communicated with the air channel 7 through the air intake, and the air vent is communicated with the outside. As shown in FIG. 7, air vents are provided on both side walls of the filtered water box, and the upper end of the filtered water box is provided with a notch to form an air intake.

The oil smoke in the air channel 7 is filtered by the water surface in the filtered water box 75 and then is discharged from the lower shell 1, so that the oil smoke and water vapor are discharged after double filtration, which greatly reduces the harm of oil smoke and the like to human health, and reduces the secondary pollution caused by circulating air to food materials because the air channel 7 is not designed as a circulating air channel 7.

Preferably, the rotating speed detection component 6 comprises a speed measuring sensor, the speed measuring sensor is a Hall sensor or a photoelectric sensor, the fan component 4 comprises a variable-frequency motor 41 and a wind wheel 42 mounted at the output end of the variable-frequency motor 41, the rotating speed detection component 6 is mounted on the wind wheel 42 and is configured to detect the rotating speed of the wind wheel 42, and the variable-frequency motor 41 and the rotating speed detection component 6 are electrically connected with the controller, respectively.

The rotating speed measuring sensor is configured to detect the rotating speed of the wind wheel 42 and send the rotating speed to the controller. The controller controls the variable-frequency motor 41 according to the real-time rotating speed of the wind wheel 42, so that the rotating speed of the wind wheel 42 can accurately reach the set rotating speed.

On the basis of the above, the smokeless frying and baking machine further comprises an oil receiving tray 74, wherein the air channel 7 is provided with an oil leakage hole on a side wall below the fan component 4, and the oil receiving tray 74 is mounted on the lower shell 1 and is located below the oil leakage hole.

The oil receiving tray 74 is provided below the fan, which is convenient to collect and clean oils and fats.

Preferably, the smokeless frying and baking machine further comprises two oil baffle plates 8, and the two oil baffle plates 8 are detachably provided on both sides of the lower shell 1. Specifically, the oil baffle plates 8 are in magnetic adsorption connection with the lower shell 1, preventing a large amount of oil from splashing on the table top. It is convenient to disassemble and wash the magnetically attracted oil baffle plate 8.

The fan component 4, the filter grille 73, the oil receiving tray 74 and the filtered water box 75 are detachably mounted on the lower shell 1, which is convenient to clean.

Embodiment 2

As shown in FIG. 9, based on the smokeless frying and baking machine disclosed in Embodiment 1, a control method thereof is proposed, specifically comprising:

Step 1, detecting the change of the angle between a handle and an upper shell, and calculating the actual volume Q1 of a frying and baking cavity formed by enclosing an upper baking tray and a lower baking tray;

Step 2, presetting the maximum volume Q2 of the frying and baking cavity, and comparing the actual volume Q1 with the maximum volume Q2;

if the actual volume Q1 is less than or equal to the maximum volume Q2, calculating the desired rotating speed corresponding to the actual volume, and controlling the fan component to run at the desired rotating speed;

calculating the desired rotating speed V with the formula: $V=V0+Q1*\Delta V$, where V0 is the preset rotating speed in the current cooking stage, and $\Delta V$ is the preset speed variable that varies with the volume of the frying and baking cavity;

detecting the actual rotating speed. V' of the fan component, and calculating the desired cooking duration of the current cooking stage of the frying and baking machine according to the actual rotating speed. V' of the fan component;

calculating the desired cooking duration T with the formula: $T=T0+V'*\Delta T$, where TO is the preset cooking duration of the current cooking stage, and $\Delta T$ is the preset time variable that varies with the volume of the flying and baking cavity;

adjusting the duration of the current cooking stage of the frying and baking machine to the desired cooking duration;

if the actual volume Q1 is greater than the maximum volume Q2, adjusting the rotating speed of the fan component to the maximum rotating speed until the end of the current cooking stage.

The actual volume Q1 of the frying and baking cavity enclosed by the upper baking tray 31 and the lower baking tray 11 is calculated with the formula:

$$Q1=a*b*(\Delta R*m)$$

where a is the length of a baking tray, b is the width of a baking tray, $\Delta R$ is the resistance change value detected by an angle sensor, and m is a quantitative coefficient.

In this embodiment, the maximum rotating speed Vmax of the fan component is calculated with the formula:

$$Vmax=V0+Q2*\Delta V$$

Of course, the present disclosure is not limited to the above embodiments, Those skilled in the art can also make equivalent modifications or substitutions without departing from the spirit of the present disclosure, and these equivalent modifications and substitutions are all included in the scope defined by the claims of the present disclosure.

What is claimed is:

1. A smokeless frying and baking machine, comprising:

a lower shell (1), which is provided with a lower baking tray (11);

a handle (2), which is rotatably mounted on the lower shell (1);

an upper shell (3), which is provided with an upper baking tray (31), wherein the upper shell (3) is rotatably mounted on the handle (2), and the handle (2) is configured to drive the upper shell (3) to rotate back and forth to be close to the lower shell (1) so that the upper baking tray (31) and the lower baking tray (11) are enclosed to form a frying and baking cavity or rotate away from the lower shell (1) to the position of unfolding the tray;

a fan component (4), wherein the lower shell (1) is provided with an air channel (7), the fan component (4) is mounted on the lower shell (1) and is configured to generate negative pressure in the air channel (7) to suck oil smoke generated by the lower baking tray (11) and the upper baking tray (31), an angle detection component (5), wherein the angle detection component (5) is mounted between the handle (2) and the upper shell (3) and is configured to detect the change of the angle between the handle (2) and the upper shell (3);

a rotating speed detection component (6), wherein the rotating speed detection component (6) is mounted on the fan component (4) and is configured to detect the actual rotating speed of the fan component (4);

two oil baffle plates (8), and the two oil baffle plates (8) are detachably provided on both sides of the lower shell (1);

a controller, which is mounted on the lower shell (1) and is electrically connected with the fan component (4), the angle detection component (5) and the rotating speed detection component (6), respectively, wherein the controller is configured to calculate the actual volume of the frying and baking cavity according to the angle change, when the actual volume is less than the maximum volume, control the rotating speed of the fan component (4) according to the desired rotating speed calculated by the actual volume, and then calculate the desired cooking duration of the current cooking stage of the frying and baking machine according to the actual rotating speed.

2. The smokeless frying and baking machine according to claim 1, wherein the air channel (7) is provided with two air inlets, and the two air inlets are both provided at the rear side of the lower shell (1) and are distributed at intervals from front to back.

3. The smokeless frying and baking machine according to claim 2, wherein the two air inlets comprise a first air inlet (71) and a second air inlet (72), respectively, and when the first air inlet (71) is located above the lower baking tray (11) and the upper baking tray (31) is distributed in the position of unfolding the tray, the second air inlet (72) is located above the upper baking tray (31).

4. The smokeless frying and baking machine according to claim 1, further comprising a filtered water box (75), wherein the filtered water box (75) is provided with an air intake and an air vent communicated with the inside thereof, the filtered water box (75) is provided at the outlet of the air channel (7) and is communicated with the air channel (7) through the air intake, and the air vent is communicated with the outside.

5. The smokeless frying and baking machine according to claim 1, wherein the rotating speed detection component (6) comprises a speed measuring sensor, the speed measuring sensor is a Hall sensor or a photoelectric sensor, the fan component (4) comprises a motor (41) and a wind wheel (42) mounted at the output end of the motor (41), the rotating speed detection component (6) is mounted on the wind wheel (42) and is configured to detect the rotating speed of the wind wheel (42), and the motor (41) and the rotating speed detection component (6) are electrically connected with the controller, respectively.

6. The smokeless frying and baking machine according to claim 1, further comprising an oil receiving tray (74), wherein the air channel (7) is provided with an oil leakage hole on a side wall below the fan component (4), and the oil receiving tray (74) is mounted on the lower shell (1) and is located below the oil leakage hole.

7. The smokeless frying and baking machine according to claim 1, wherein the oil baffle plates (8) are in magnetic adsorption connection with the lower shell (1).

* * * * *